Nov. 18, 1924.  1,515,962
W. J. MILLER
APPARATUS FOR FORMING ARTICLES OF GLASS
Filed Oct. 16, 1919  9 Sheets-Sheet 1
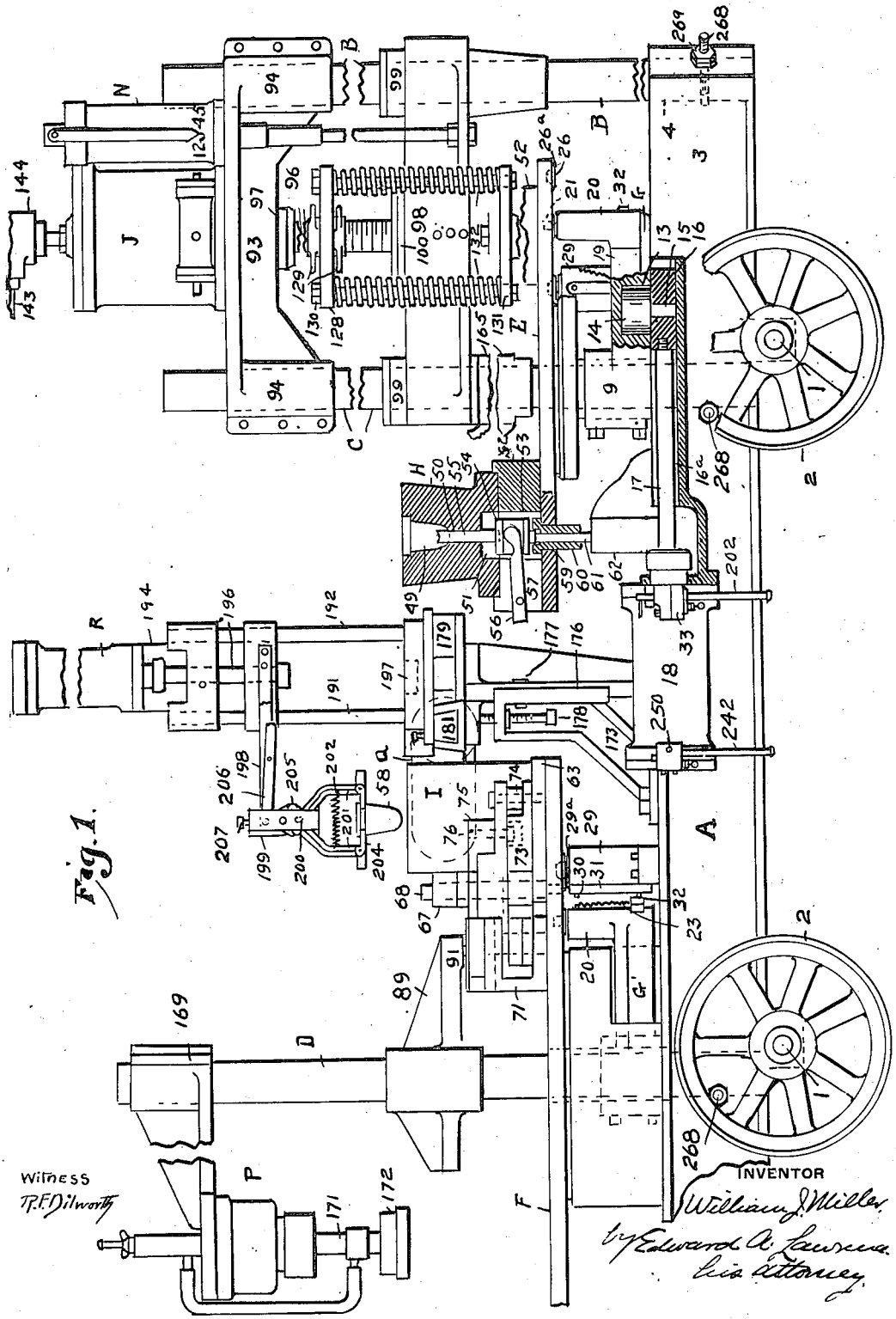

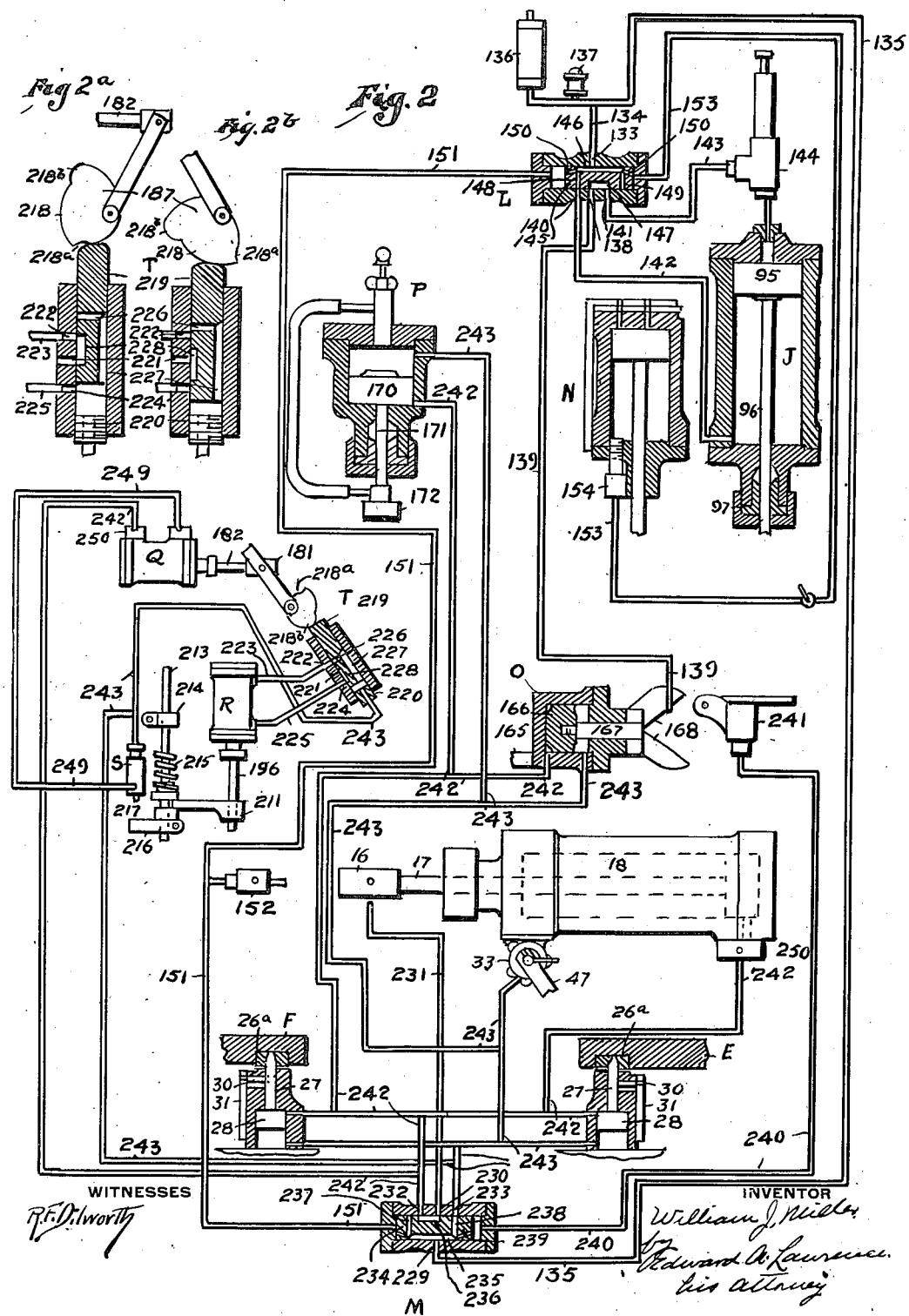

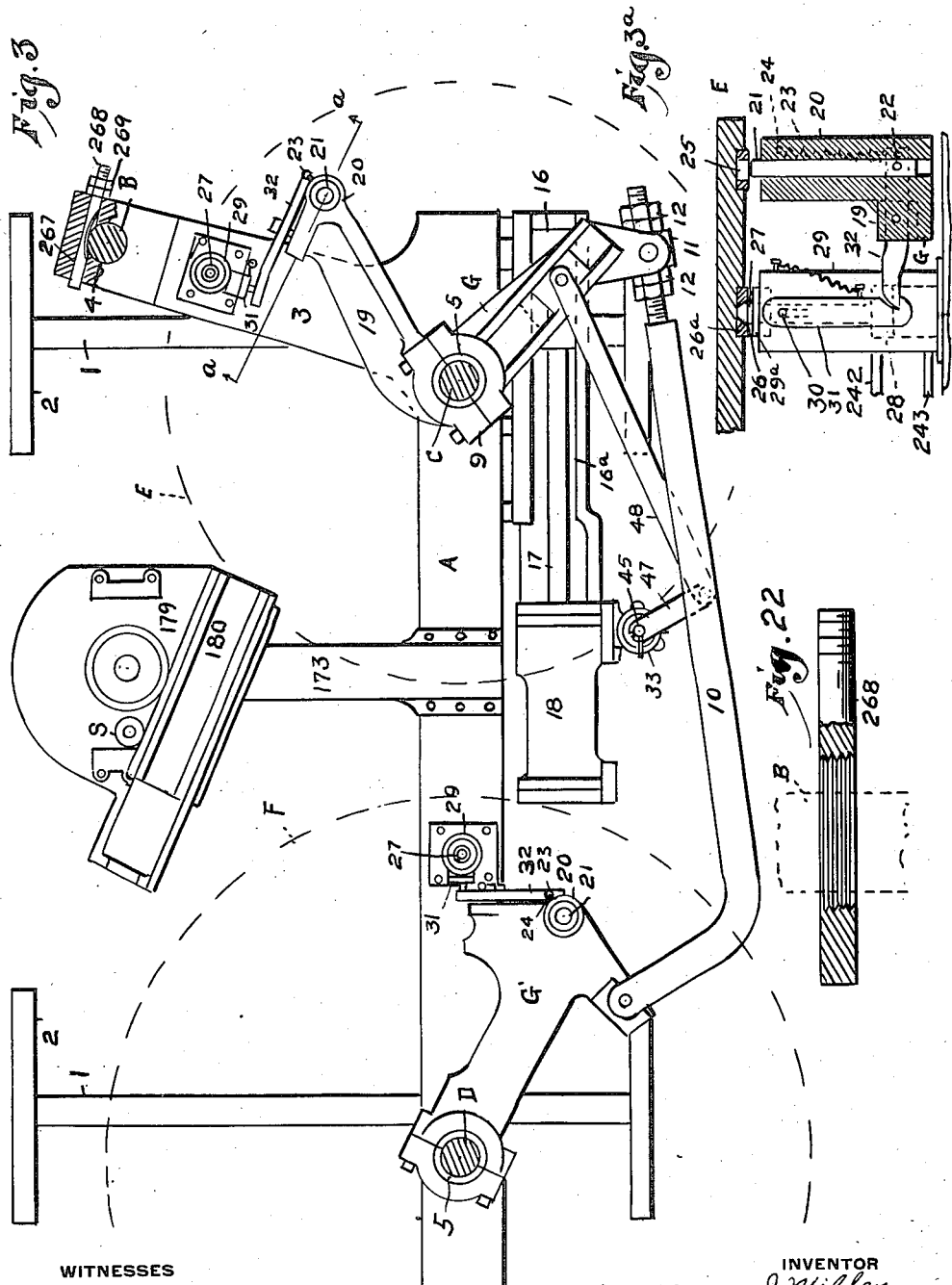

Nov. 18, 1924.
W. J. MILLER
1,515,962
APPARATUS FOR FORMING ARTICLES OF GLASS
Filed Oct. 16, 1919
9 Sheets-Sheet 4
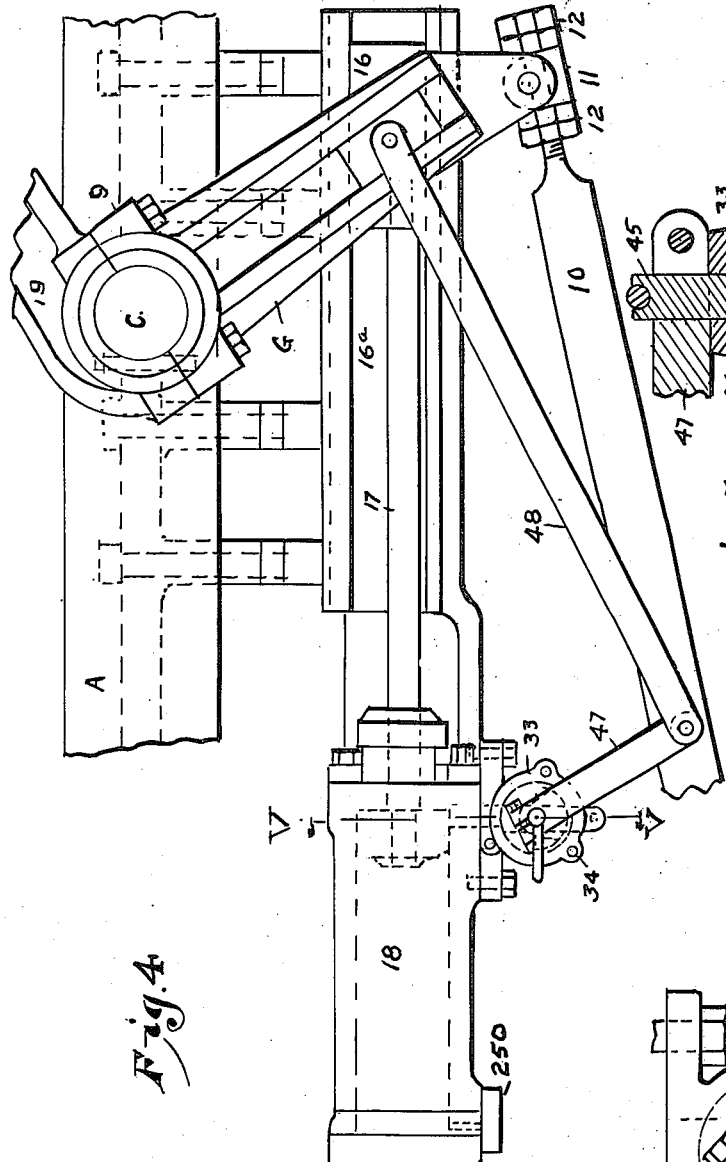
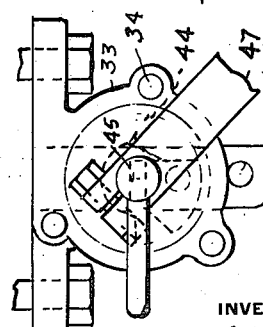
WITNESSES
INVENTOR

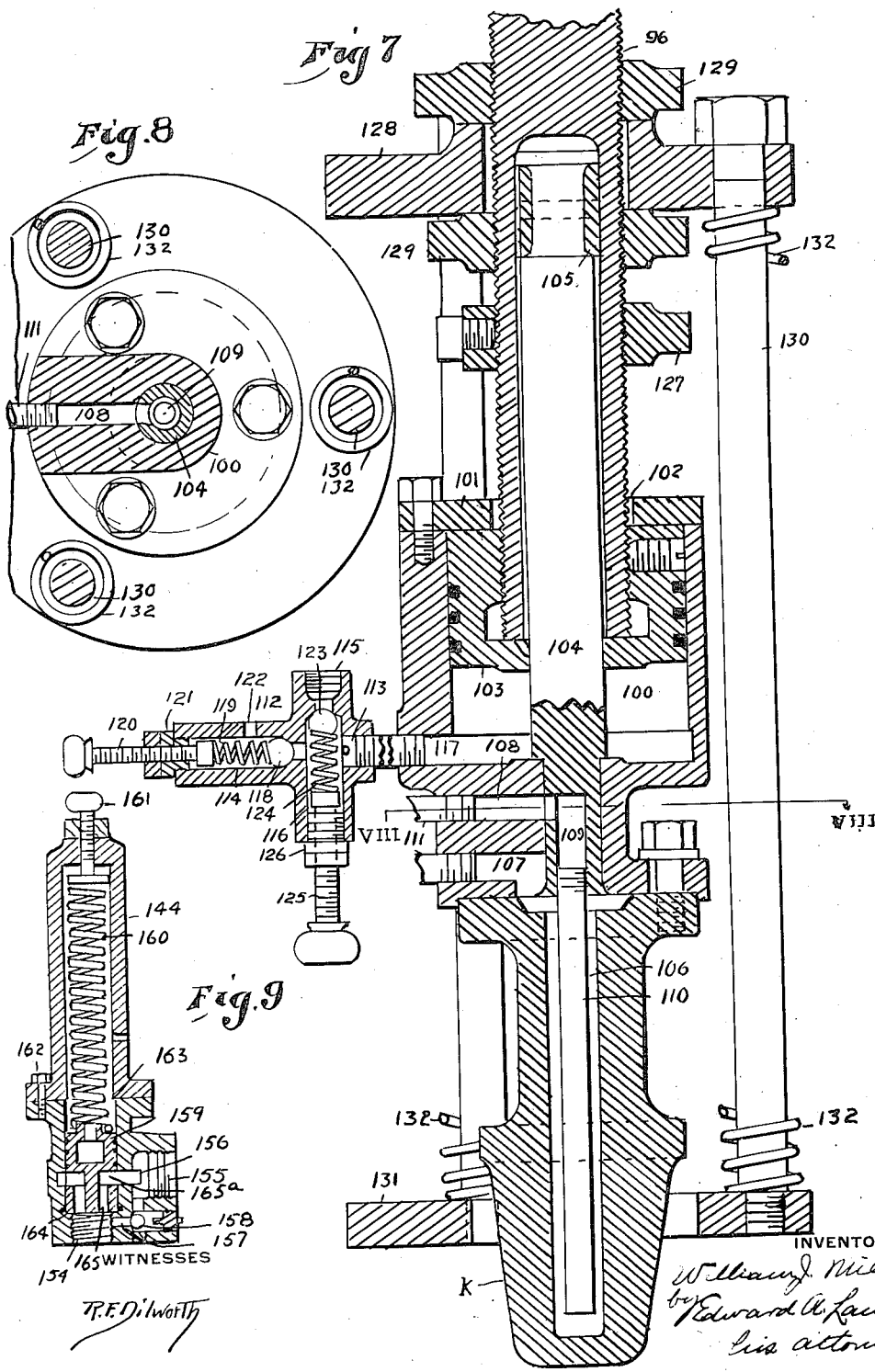

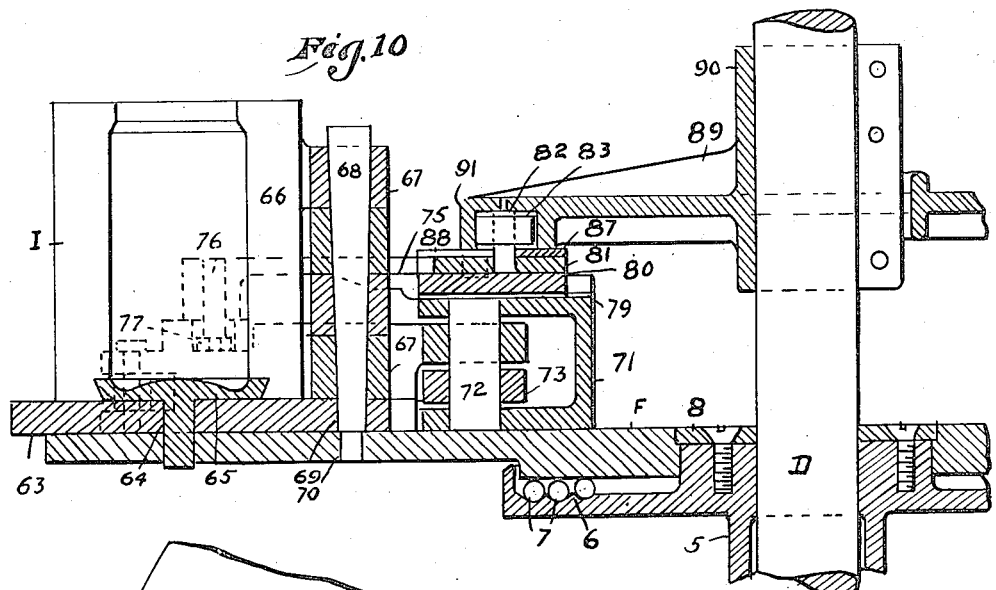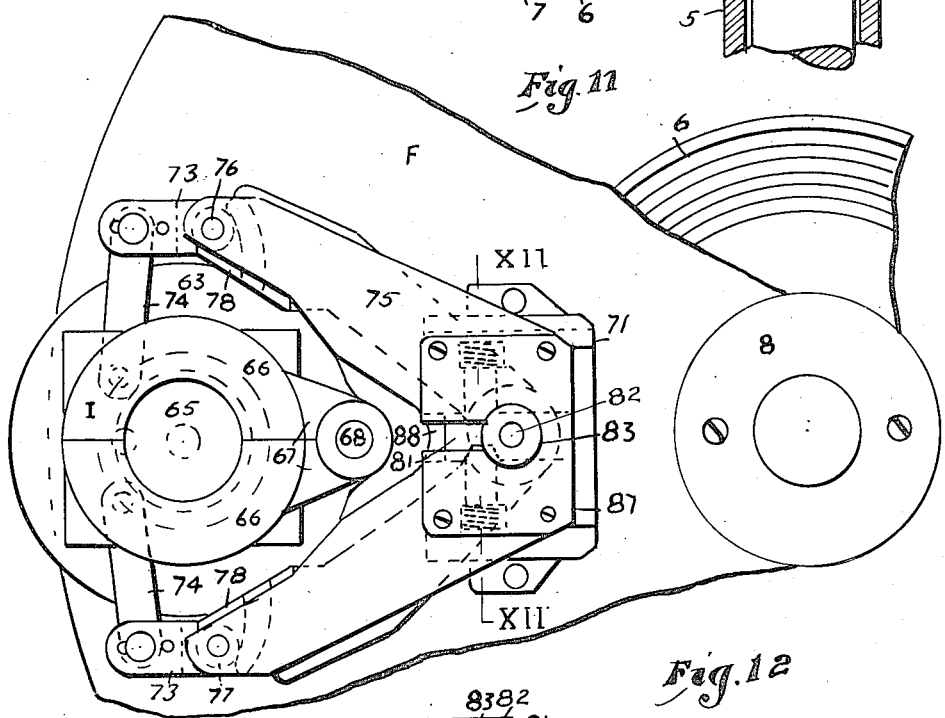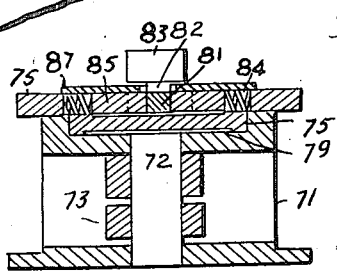

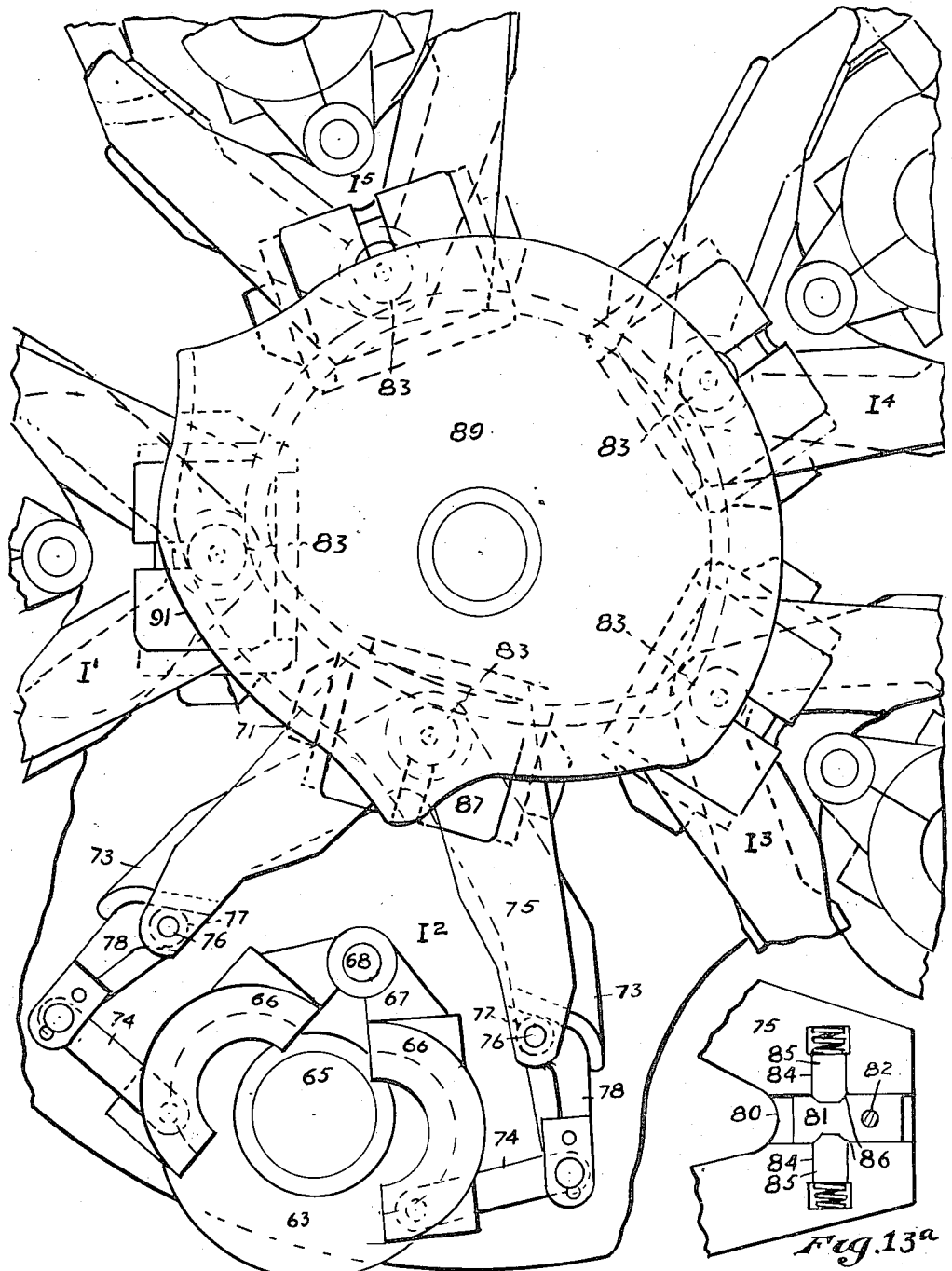

Nov. 18, 1924.  
W. J. MILLER  
1,515,962  
APPARATUS FOR FORMING ARTICLES OF GLASS  
Filed Oct. 16, 1919  
9 Sheets-Sheet 8
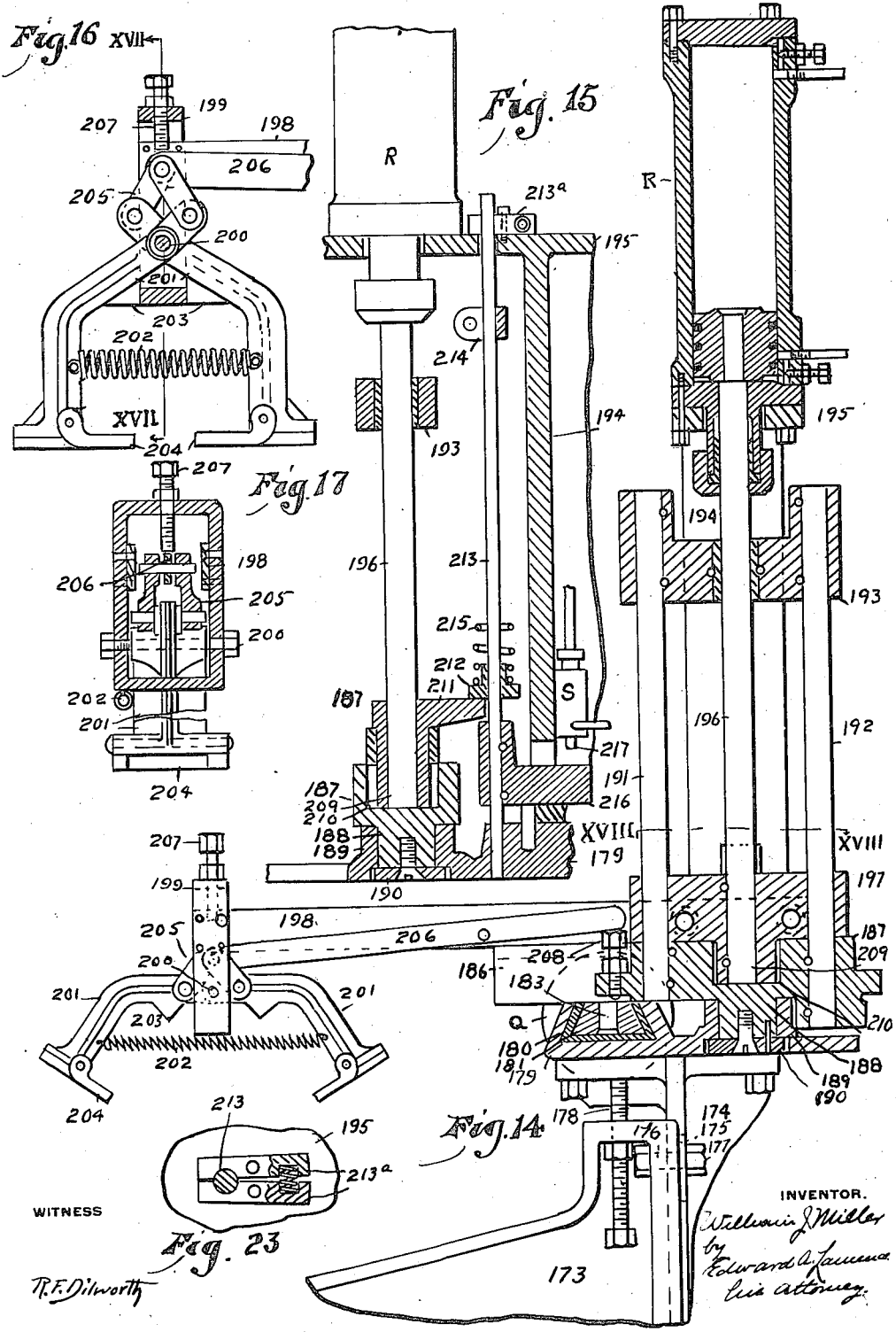

Nov. 18, 1924.
W. J. MILLER
1,515,962
APPARATUS FOR FORMING ARTICLES OF GLASS
Filed Oct. 16, 1919  9 Sheets-Sheet 9
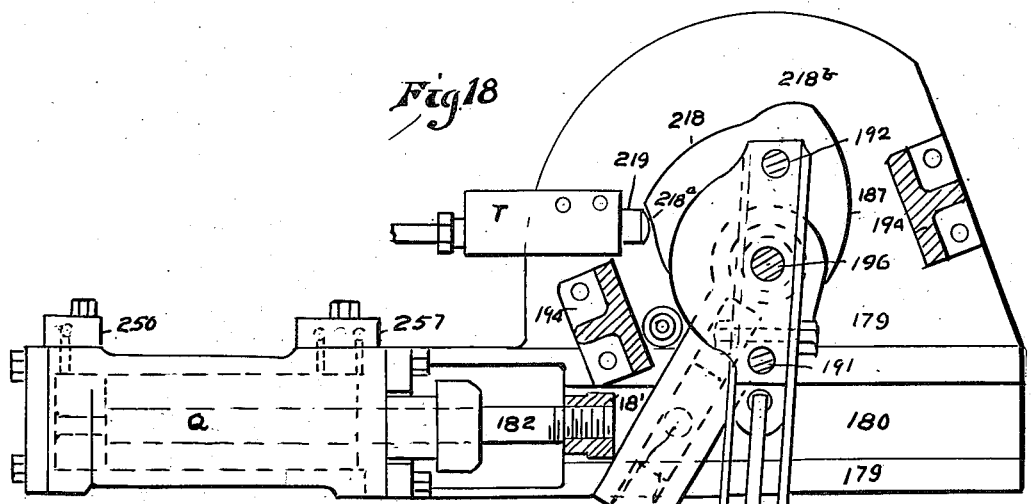
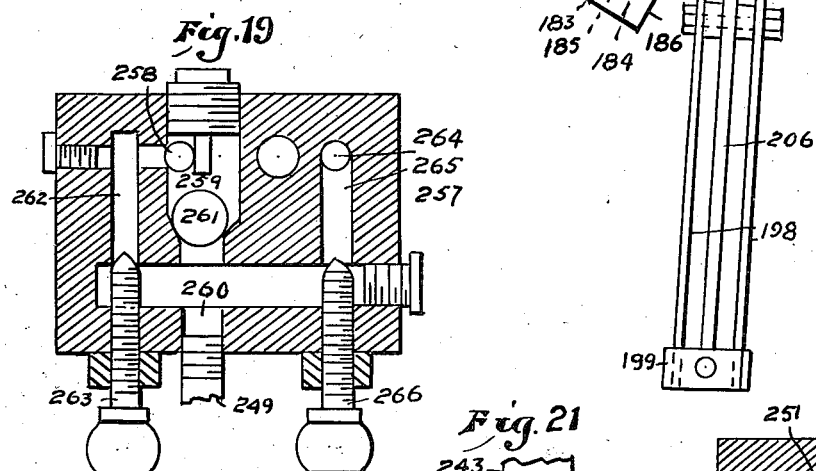
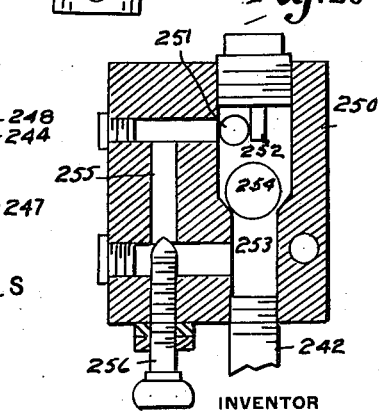
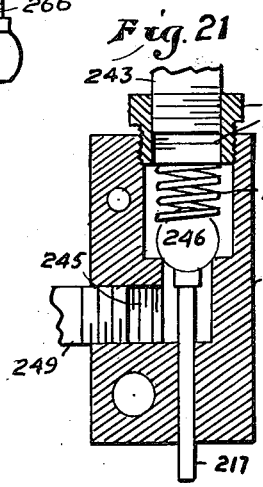
WITNESSES
INVENTOR Patented Nov. 18, 1924.

1,515,962

UNITED STATES PATENT OFFICE.

WILLIAM J. MILLER, OF SWISSVALE BOROUGH, PENNSYLVANIA.

APPARATUS FOR FORMING ARTICLES OF GLASS.

Application filed October 16, 1919. Serial No. 331,018.

*To all whom it may concern:*

Be it known that I, WILLIAM J. MILLER, a citizen of the United States, and residing in the borough of Swissvale, in the county of Allegheny and State of Pennsylvania, have invented or discovered new and useful Improvements in Apparatus for Forming Articles of Glass, of which the following is a specification.

My invention consists of new and useful improvements in apparatus for forming articles of glass.

More particularly my invention is intended to be applied to the duplex table, transfer type of machine, wherein the parison is first pressed in a parison mold and then transferred to a finishing mold wherein it is given its final form.

I show new and improved mechanism for rotating the parison mold table and the finishing mold table in unison and intermittently. I show new and improved transfer mechanism for removing the parison from one table to the other. I show new and improved means for pressing the parison. I show new and improved means for opening and closing the finishing molds.

I show new and improved fluid pressure mechanism for operating the various portions of the machine in proper synchronization and speed.

Other novel features of construction and arrangement of parts will appear from the following description.

In the accompanying drawings, which are merely intended to illustrate a practical embodiment of the principles of my invention without limiting the scope of the same to the construction shown, Fig. 1 is a broken side elevation, also partly in section, of a duplex transfer machine to which my improvements are applied; Fig. 2 is a diagrammatic view showing the fluid pressure operation of the machine; Fig. 2ª shows the piston valve extended; Fig. 2ᵇ shows said valve at neutral, the valve being shown retracted in Fig. 2; Fig. 3 is a plan view of the chassis of the machine; Fig. 3ª is an enlarged detail in section along the line 3ª—3ª in Fig. 3; Fig. 4 is an enlarged plan view showing the mechanism for rotating the mold tables; Fig. 5 is an enlarged detail, in section along the line V—V in Fig. 4; Fig. 6 is an enlarged top plan view of the cushion valve shown in Fig. 5; Fig. 7 is an enlarged but broken vertical section of the pressing mechanism; Fig. 8 is an enlarged view taken along the line VIII—VIII in Fig. 7; Fig. 9 is an enlarged vertical section of the pressure reducing valve for the pressing cylinder; Fig. 10 a broken diametric section of the finishing mold table, showing one of the molds and the mechanism for opening and closing the same; Fig. 11 is a plan view of the same; Fig. 12 is a sectional view along the line XII—XII in Fig. 11; Fig. 13 is a diagrammatic view in plan showing the function of the cam member in opening and closing the finishing molds; Fig. 13ª is a detail of the mold yoke, the slide and the spring dogs which lock the slide to the yoke; Fig. 14 is a side view, partially in vertical section showing the parison transfer mechanism; Fig. 15 is another view of the same in section at right angles to Fig. 14; Fig. 16 is a side elevation showing the parison jaws closed, the same being shown open in Fig. 14; Fig. 17 is a sectional view along the line XVII—XVII in Fig. 16; Fig. 18 is a view of the transfer mechanism taken in section along the line XVIII—XVIII in Fig. 14; Fig. 19 is an enlarged section of the double cushion valve; Fig. 20 is a similar view of the single cushion valve; and Fig. 21 is a similar view of the check valve; Fig. 22 is a detail showing the methods of securing the standards B, C and D to the frame A, and Fig. 23 is a broken top plan view of transfer frame top plate.

The following is a detailed description of the drawings.

I will first describe the machine chassis and the mechanism for rotating the two mold tables.

A is the horizontal bed frame which may be a casting, or formed of structural steel, and which is supported at its ends by axles 1 and wheels 2, one of said axles being centrally pivoted to the frame so that the machine may be conveniently moved to any desired location.

One end of the frame is provided with an angularly disposed extension 3 provided with a vertically disposed socket 4 in which is clamped by means to be later described the lower end of the vertical standard B. Adjacent to either end of the main frame is provided similar sockets in which are rigidly secured the lower ends of the standards C and D, the standard C being adjacent to the standard B.

5 represents sleeves fitting down over the standards C and D at their base and fixed thereto to prevent rotation. Said sleeves are provided with integral annular raceways 6 for the ball bearings 7. The mold tables E and F are annular and fit down over said sleeves 5 and rest on the ball bearings. The inner top edges of said tables are grooved to receive the perimeter of the annular guard plates 8 which are attached to the upper ends of the sleeves 5, thus preventing the tables from tilting and insuring their rotating in a true horizontal plane. E is the parison mold table and F is the blow or finishing mold table.

G is a rotator arm journaled to swing in a horizontal plane about the sleeve 5 on the standard C by means of its split hub 9. G′ is a second rotator arm similarly journaled on the sleeve 5 of the standard D. Said arms are linked together to swing in unison by means of a connecting rod 10 whose one end is pivotally secured to the arm G′ while its other end is cylindrical and threaded to extend through the unthreaded bore of a block 11 pivoted to the arm G to swing in a horizontal plane. 12 are nuts screwed up on the rod 10 on either side of the block 11 to adjust the relative positions of the two rotator arms.

The under face of the arm G is provided with a longitudinal groove 13 which forms a slideway for the block 14 which is pivoted, as by the pin 15 to a block 16 which in turn is attached to the outer end of the piston rod 17 of the pressure fluid rotator cylinder 18, mounted on the frame A. The block 16 moves in a slideway 16ᵃ on the frame A. It is evident that when the piston rod 17 is extended by the admission of fluid to the rear end of the cylinder 18, the arms G and G′ will be swung counterclockwise, while the retraction of the piston rod by the admission of power to the front end of said cylinder would swing the rotator arms clockwise. The counterclockwise movement and the clockwise movement will hereafter be termed the "forward" and "backward" movements, respectively.

The hub of the arm G is provided with a radial extension 19 provided with a vertical cylindrical bearing 20 open at top and bottom and the arm G′ is provided with a similar bearing 20. 21 represents table rotating pins sliding vertically in said bearings 20 and normally extended from the upper ends of the same by means of radial studs 22 on the lower portions of said pins extending through longitudinal slots through the walls of said bearings and attached at their outer ends to helical springs 23 whose upper ends are secured to studs 24 protruding from the walls of the bearings.

The tables E and F are provided on their lower faces with concentrically disposed series of rotator pin holes 25, one for each mold on the table, the number of molds on each table being the same. These holes are adapted to be engaged in turn by the pins 21 during the forward movement of the rotator arms, thus turning the tables on their axes. The tables are each also similarly provided with a concentric row of locking holes 26, outside of the holes 25, which when the tables come to rest after a forward movement are in turn engaged by the protruding and preferably bevelled ends of the piston rods 27 of pistons 28 which work in small fluid pressure cylinders 29 mounted on the frame A. The piston rod openings of the cylinders 29 are longitudinally slotted to permit the protrusion of the studs 30 radially fixed in said piston rods and 31 are tripping levers whose upper ends are pivoted to the protruding ends of said studs 30.

The lower ends of said levers are notched to form a catch for the ends of the rocking levers 32 which are pivoted intermediate of their ends to the rotator arm G′ and the extension 19 of the rotator arm G, respectively, and whose other ends are slotted to pivotally engage the studs 22 of the locking pins 21.

The fluid pressure system is arranged to admit pressure to the lower ends of the two cylinders 29 as the tables complete their forward movement, thus elevating the locking rods 27 into engagement with the two pin holes 26 which are in register therewith, and the elevation of said piston rods will cause the notched ends of the levers 31 to catch and elevate the free ends of the levers 32, thus pulling downwardly the rotator pins 21 and disengaging them from the holes 25, so that when the rotator arms move backwardly said pins 21 will move out from in under said holes and when the levers 32 are moved away from the levers 31, said pins will be drawn by their springs up into contact with the lower faces of the mold tables and will trail along the same until the rotator arms complete their backward movement when the said rotator pins 21 will slip up into engagement with the next pair of holes 25, so that when the rotator arms begin their next forward movement the tables will again be turned counterclockwise. The fluid pressure connections are such that when the rotator arms are about to begin their forward movement, the locking rods 27 are retracted downward out of engagement with the holes 26, thus unlocking the tables for their next movement. Thus the mold tables are intermittently rotated counterclockwise.

The locking holes 26 are preferably provided with bushings 26ᵃ of hardened steel to take the wear and these bushings project downwardly from the surface of the tables.

The upper ends of the locking cylinders are also provided with similar bushings 29ᵃ which extend upwardly and just clear the depending bushings 26ᵃ. The locking cylinder 29 of the parison table E is positioned under the pressing mechanism, so that when the pressing pressure is applied the bushing 26ᵃ is supported by the bushing 29ᵃ, thus supporting the table and preventing its tilting or the straining of its mounting.

To prevent the tables from completing their forward movements with a jar, I provide a cushion valve 33 for the forward end of the cylinder 18 to retard the escape of fluid pressure in front of the advancing piston, as it approaches the completion of its stroke. This valve is shown in Figs. 4 and 5 and consists of a casting or block bolted to the cylinder and made in two parts clamped together by the bolts 34. 35 is a valve chamber which is connected by the passages 36 with the port 37 in the forward end of the cylinder 18. 38 is another passage connecting said valve chamber to the fluid pressure pipe which supplies fluid pressure to this end of the cylinder. The passage 38 is closed by an inwardly opening ball valve 39. 40 is a by-pass passage that connects the passage 38, outside of the ball valve 39, with the opposite side of the valve chamber 35, and 41 is a restricted passage connecting the passage 40 with the chamber 35 adjacent to the ball valve. Said restricted passage 41 is controlled by a needle valve 42 which works in a threaded hole 43 in the valve body and may be adjusted from without. 44 is a rotary valve disk working in the chamber 35 to close or adjust the inner or chamber end of the passage 40. The disk is rotated by means of its stem 45 which protrudes through a bearing 46 in the valve body and has clamped to its protruding end the split socket which forms one end of a lever 47 whose other end is pivoted to one end of a link 48 whose other end is pivoted to the rotator arm G. It is evident that fluid pressure entering the cylinder 18 from the fluid pressure pipe and the passage 38 will force aside the ball valve 39 and pass unimpeded through the valve chamber 35 and the passage 37 to the cylinder. When, however, the pressure is being relieved from the cylinder end, the ball valve 39 is forced into its seat closing the passage 38 and the pressure must escape through the passages 40 and 41. The capacity of these passages is controlled by the valve disk 44 and the needle valve 42, respectively, and the rate of pressure relief is thus adjustable.

The parts are so assembled that as the rotator G approaches the end of its forward swing, the disk 44 gradually closes the mouth of passage 40 and the pressure finally can only escape through the passage 41 whose capacity is adjustable by means of needle valve 42. Thus the tables are brought to a stop without a jar. If desired, a cushion valve may be provided for the rear end of cylinder 18 to cushion the backward movement of the rotator arms.

A plurality of parison molds H are mounted on table E and the same number of blow or finishing molds I on table F. In the diagrammatic view in Fig. 13, I have indicated five molds which is the usual number of each kind employed. For the sake of clearness, I have indicated but one mold on each table in Fig. 1. The parison molds H are usually solid or one pieced with a downwardly tapered mold cavity 49 into the bottom of which extends the axial circular hole 50 countersunk or enlarged at its lower end as at 51. 52 is a block which rests on the table E and upon which the mold H is seated. Said block has an axial hole 53 registering with the lower end 51 of the hole 50. 54 is a circular block working in the holes 53 and 51 and having a reduced, upwardly extending stem 55 which works in the hole 50 and when in its lower position, closes the bottom of the mold cavity. The block 54 is recessed diametrically to receive the inner end of a hand lever 56 extending through and pivoted in a radial opening 57 in the block 52. Thus by depressing the outer end of the lever 56, the stem 55 is projected up into the mold cavity, as shown in Fig. 1, elevating the pressed parison 58 so that it may be removed. The mold table E is provided with a vertical hole 59 in which is mounted a bushing 60 whose bore registers with the hole 53 and 61 is a headed pin depending through said bushing, so that when the mold approaches the transfer station with the pressed parison contained therein, the lower end of the pin 61 will engage an upwardly inclined track 62 supported by the frame A, thus forcing said pin upwardly and elevating the block 54 and its stem 55 and thereby raising the parison part way from the mold so that it may be seized by the transfer jaws. During the first part of the next forward movement of the table, the pin 61 passes off the track 62 so that the stem 55 will drop and the mold will be ready to receive a fresh gather.

I will now proceed to describe the blow or finishing molds I, equal in number to the parison molds H, and mounted on the table F. A characteristic mold I and its mounting are shown in Figs. 10 and 11. 63 is a mold plate mounted on the table F provided with a vertical hole 64 which registers with a similar hole in the mold table, and 65 is the changeable mold bottom whose stem engages said registering holes. The mold parts 66 are pivotally connected together by means of interlacing hinge lugs 67 which are connected together by the vertical pintle 68 whose lower end is stepped in registering holes 69 and 70 in the mold plate 63 and the table, the lower end of said pintle being reduced in size to fit the smaller hole 70 to prevent the pintle dropping out. 71 is a box with its front and forward sides open, bolted to the table F and having mounted vertically therein the pivot pin 72 which pivotally connects together the inner ends of the pair of swinging arms 73 which slide on the table F and have their outer ends bifurcated to pivotally receive the ends of links 74 whose other or adjacent ends are pivotally attached to the mold parts 66.

75 is a yoke member whose outer ends are provided wtih depending headed pins 76 provided with anti-friction rollers 77 which work in angular slots 78 in the top surfaces of the arms 73.

The stem of the yoke 75 slides radially of the table F on top of the box 71, the top of the box being provided with a depressed slideway 79 for that purpose. The said stem is provided on the top with a longitudinal slideway 80 in which is mounted a block 81 provided with an upwardly extending pin 82 upon which is journaled a roller 83. Said slideway 80 is intersected by a pair of seats 84 for the spring actuated dogs 85 carried by the yoke stem and normally engaging notches 86 in the sides of block 81. A cover plate 87 screwed to the top of the yoke stem and provided with a slot 88 for the pin 82 prevents displacement of the block and dogs.

89 is a cam member adjustably mounted on the standard D by its split hub 90, and provided with a depending cam track 91 which is engaged from without by the rollers 83 associated with the various molds on the table F. In Fig. 13 I have illustrated the action of the cam track on the molds diagrammatically. The mold stations, shown as five in numbers are designated as I', I², I³, I⁴, and I⁵.

It is evident that when the roller is in the position shown in Figs. 10 and 11 the mold is closed, but should the roller 83 be drawn inwardly toward the axis of the table by the contour of the cam track 91, the yoke 75 will be moved therewith and the mold opened, as shown at I² in Fig. 13. The cam track 91 maintains the proper radial distance from the axis of the cam to hold the molds closed except between the stations I' and I³, reaching its maximum retraction toward the axis at the station I², and an outer wing track 95 is provided along this portion to force the rollers 83 to follow the flattening of the cam, so as the mold advances from station I' to I² it opens and as it advances from I² to I³ it closes and remains closed until it again leaves station I'. Station I³ is the transfer station where the mold receives the parison from the transfer device. While passing through stations I⁴ and I⁵, the parison is being reheated. At station I' the parison is blown, the blow head being positioned at this point, and station I² is the take-off where the finished article is removed from the mold.

In case, from any cause, the mold resists opening or closing, the dogs 85 will slip from the notches 86 and thus prevent breaking or straining the machine parts.

It is evident that the molds open directly without any shift toward or away from the axis of the machine, the action being identical with that of a hinged mold opened by a workman.

I will now describe the pressing mechanism for forming the parison in the molds H.

93 is a cross-head provided with split collars 94 by means of which said cross-head may be fixed at the desired elevation on the standards B and C. J is a fluid pressure cylinder mounted vertically on said cross head and provided with a piston 95 whose piston rod 96 depends through a gland 97 in the lower head of the cylinder J. 98 is a sliding cross head mounted on the standards by extended sleves 99. 100 is a cushion cylinder formed in the center of said cross head having a bolted on top 101 through whose axial opening 102 extends piston rod 96, and 103 is a piston mounted on said rod within cylinder 100. The lower portion of piston rod 96 is upwardly bored to receive a guide stem 104 which is fixed in an axial hole in the bottom of the cylinder 100 and the cross head 98. 105 is a packing on the upper end of the stem to maintain a snug fit in the bore of the piston rod.

K is the pressing plunger, which is interchangeable to suit the character of parison molds used, and which is secured to the under side of the cross head 98 by bolts, in alinement with the piston rod and stem.

The pressing plunger K has an internal bore or cavity 106 open at the top where it is enlarged or countersunk. 107 is an L-shaped passage in the cross head leading from without into the bore of the plunger. 108 is a similar passage in the crosshead leading from without to the internal passage 109 in the stem 104 which is threaded at its lower end to receive a short pipe 110 which extends down into but short of the bottom of the interior of the pressing plunger. 111 represents pipe connections screwed into the threaded outer ends of the passages 107 and 108 for the attachment of flexible hose so that a current of water may be maintained in the interior of the pressing plunger to cool the same.

The air connection for the bottom of the cylinder 100 to atmosphere is preferably as follows.

112 is an air reducing or retarding valve and is shown as cruciform and of the following construction. 113, 114, 115 and 116 are four intersecting passages, the passage 113 being connected to the lower end of the cylinder 100 at the cylinder port 117. 118 is an outwardly opening ball valve in passage 114 resiliently seated by a spring 119 whose compression is adjustable by means of a thumb bolt 120 screwed in a threaded bushing 121 in the end of the passage 114.

122 is an escape port to atmosphere outside of the valve 118. 123 is an inwardly opening ball valve in passage 115 resiliently seated by a spring 124 whose compression is adjusted by a thumb bolt 125 screwed in a threaded bushing 126 fixed in the end of passage 116.

It is evident that the downward movement of the piston 103 in the cylinder 100 will force open the ball valve 118 to permit the escape of air, while the upward movement of said piston will suck open the ball valve 123 to permit the entrance of air. The reducing valve 112 thus has a retarding and cushioning effect on the movement imparted to the pressing plunger by the piston rod 96, and this effect may be regulated by adjusting the thumb bolts 120 and 125.

The piston rod 96 is exteriorly threaded and 127 is a ring nut screwed thereon which when the pressing mechanism is being adjusted may be screwed down to the proper position to indicate the extreme depression of the piston 103 in the cylinder 100 so that the proper adjustment of the cylinder J may be obtained.

128 is an annular head adjustably mounted on piston rod 96 by upper and lower nuts 129. 130 represents headed rods depending through holes in said head and having their lower threaded ends screwed into holes in the usual mold ring 131. 132 are helical springs coiled about the rods 130 between the head and the mold ring. The function of the mold ring is to bear upon the top of the parison mold as the plunger enters the same and to lag behind the plunger when the latter begins the ascent to prevent the parison following the plunger from the mold.

L is an automatic valve having a cylindrical casing with closed end. On one side said casing is provided with a central port 133 connected by a pipe 134 with the constant fluid pressure supply pipe 135 which is preferably provided with a strainer valve 136 and an oiler 137.

Diametrically opposite from the port 133 is a pressure relief port 138 to which is connected a fluid waste pipe 139 which discharges on the shear blades to cool the same. 140 and 141 are ports on either side of relief port 138. Port 140 is connected by pipe 142 to the bottom of the cylinder J which port 141 is connected by the pipe 143 with the upper end of the cylinder J.

In the pipe 143 I prefer to interpose the reducing valve 144 to be later described in detail.

145 is the sliding valve body of valve L having on one side a groove 146 always in communication with the pressure port 133 and on the other side with a shorter groove 147 which connects the port 138 with the port 140 or 141, in accordance with the position of the valve body 145. 148 and 149 represents a pair of diametric passages in the valve body communicating with the groove 146 and so placed that passage 148 will connect the port 140 with the pressure port 133 when the recess 147 connects the port 141 to the relief port 138 as shown in Fig. 2, and, vice versa, the passage 149 will connect the port 141 to the pressure port 133 when the recess 147 connects ports 140 and 138. 150 represents small bleeder passages extending through the ends of the valve body to the groove 146. The end of the valve casing adjacent to the port 140 is connected by a pipe 151 to a bleeder valve 152, said pipe also connecting one end of the second automatic valve M to said bleeder valve 152. The bleeder valve 152 is so placed as to be temporarily opened by the block 16 at the completion of its movement in rotating the mold tables thereby relieving the pressure in the corresponding end of valve L. The other end of the casing of valve L is connected by a pipe 153 with a bleeder valve 154 projecting into the bottom of the cylinder of timer N, so that when the timer piston reaches the lower end of the cylinder, said bleeder valve is opened and the pressure relieved from the corresponding end of the valve L.

The function of the time N in determining the dwell of the pressing plunger in the mold is well known and will not be described in detail.

Thus as the tables complete their forward movement, the pressure is relieved in the left end of the valve L causing the valve body to move from its position shown to the other end of the valve casing, thus connecting the port 141 to pressure and the port 140 to relief, thus admitting pressure to the upper end of the cylinder J and relieving pressure in its lower end, and thereby causing the pressing plunger K to descend into the mold which has just been positioned beneath it and containing a fresh gather of glass. When the piston of the timer reaches the bottom of the timer cylinder the bleeder valve 154 is opened, relieving pressure in the right end of valve L, thereby causing the valve body to shift back into the position shown in Fig. 2, thereby connecting the port 140 to pressure and the port 141 to relief, thereby relieving the pressure in the upper end of the cylinder J and admitting pressure to its lower end, and thereby causing the pressing plunger to rise out of the mold.

The reducing valve 144 is shown in vertical section in Fig. 9 and is of the following construction. The valve casing is in the form of a barrel, one of whose ends is provided with a port 154 which is connected to the cylinder end of the pipe 143 while 155 is a lateral port connected to the automatic valve end of the pipe 143. 156 is an internal circumferential groove which intersects the port 155. 157 is a by-pass connecting the ports 154 and 155 and provided with a ball valve 158 opening toward port 155. 159 is a piston valve working in said barrel and resiliently pressed towards port 154 by means of a helical spring 160 whose compression may be adjusted by means of thumb screw 161. The valve casing, for convenience of assemblage may be made in two parts clamped together by bolts 162. An internal shoulder 163 limits the retreat of the valve 159 away from the port 154, and a shoulder 164 limits the outward movement of the piston towards port 154. The outer end of the piston valve 159 is provided with longitudinal passages 165 connected at their inner ends with radial ports 165ª in the wall of the valve which register with the groove 156 when the valve is in its outermost position, as shown.

The operation of the valve is as follows. When pressure is being admitted to the port 155, the same enters the ports 165ª and passes along the passages 165 to the port 154, until the pressure in port 154 acting against the piston valve 159, is sufficient to overcome the resistance of the spring 160, thus causing the valve to retreat and partially or entirely sealing the entrance port 155. As soon as the pressure in port 154 falls below that required to counteract the spring 160, the valve will advance and reestablish connection between the ports 154 and 155. By adjusting the spring 160, I am enabled to regulate the pressure admitted to the upper end of the pressing cylinder.

When it is desired to permit pressure to escape from the upper end of cylinder J, it cannot pass through the passages 165 and ports 165ª, owing to the fact that the existing pressure in the cylinder end of pipe 143 has forced the valve 159 into its retreated position where it seals the port 155, but at first the pressure must escape through the by-pass 157, pass the ball valve 158. However, as soon as the pressure in the upper end of the cylinder J has been sufficiently reduced to permit the spring to move the valve 159 into the position shown in Fig. 9, then a full escape passage is opened through the passages 165 and ports 165ª.

O is the fluid pressure cylinder of the shear mechanism mounted on a bracket 165 clamped on the standard C. 166 is the piston in cylinder O and 167 its piston rod operating the shear blades 168, the extension of the piston rod serving to close the blades and its retraction to open the same. The shears are positioned on the machine so that when the operator deposits a gather of glass in the parison mold at its station next proceeding the pressing station and starts the machine by means of the operating valve to be described, the shears close and sever the neck of glass which connects the gather to the operator's punty.

P is the blowing mechanism positioned above the mold station I' of table F and supported in position by means of a bracket 169 extending radially from the standard D and adjustable vertically thereon. The detailed construction of the blowing mechanism is not a part of my present invention but consists generally of a cylinder in which works the piston 170 having a depending piston rod 171 on the lower end of which is mounted the blow head 172 which descends down onto the top of the blow mold and blows the parison to form.

I will next describe the transfer mechanism which lifts the parison from the parison mold and transfers it to the waiting blow mold at station I³.

173 is a support extending from the frame A intermediate of the mold tables and having mounted thereon a bracket 174. The attachment of the bracket to the support is such that the latter can be adjusted vertically and may consist of vertical slots 175 in the bracket and holes 176 in the support engaged by bolts 177 to clamp the bracket rigidly in any desired elevation. Positioning screws 178 are provided to properly position the bracket before tightening the bolts 177.

179 is a horizontal platform bolted onto the bracket 174 and provided with a cylinder seat upon which is mounted the horizontal transfer cylinder Q. The platform 179 is also provided with a downwardly expanding horizontal slideway 180 in which slides the block 181 mounted on the outer end of the piston rod 182 attached to the piston of the cylinder Q. Said block is pivotally attached by means of vertical pin 183 to a similar block 184 moving in longitudinal slideway 185 cut in the under side of an arm 186 extending radially from a rotary block 187 having a depending cylindrical stud 188 which is journaled in a vertical bearing 189 in the platform 179. The lower end of said bearing is undercut so that a keeper disk 190 may be attached to the lower end of the stud 188 to hold the block 187 in proper position.

191 and 192 are a pair of cylindrical standards whose lower ends are fixed at diametrically opposite points in the block 187 and whose upper ends are connected by the fixed cross head 193.

194 represents the vertical legs of a gallows frame rising from the platform 179 and connected together at the top by the integral plate 195. R is the fluid pressure operated lifting cylinder vertically mounted on said gallows frame, whose piston rod 196 depends down through a slide bearing in the fixed cross head 193 and is attached at its lower end to a moving cross head 197 which slides on the standards 191 and 192.

198 represents a pair of flat horizontally disposed bars having their inner ends bolted to the sides of cross head 197 and extending outwardly on either side of the standard 191. 199 is a four sided rectangular frame fixed on the end of bars 198 and having alined holes in its vertical walls for the bolt 200 which pivotally supports the coacting, depending jaw fingers 201. Said fingers are connected below their pivot by a helical spring 202 which tends to draw the fingers together and 203 are abutments on the fingers adapted to impinge against the frame 199 and limit the closing movement of the fingers. The lower ends of the fingers are provided with parison grasping jaws 204 which are interchangeable to suit various forms of parisons. The upper ends of the fingers 201 are connected by pivot links 205 with the outer end of a lever 206 which works between the bars 198 and is pivoted intermediate of its ends thereto to swing in a vertical plane. The upward movement of the outer end of the lever 206 is limited by an adjustment screw 207 extending down through the top of the frame 199. As the cross head 197 reaches its lowermost position, seated on the block 187, the inner end of the lever 206 is pushed up by the head of an adjustable bolt 208 mounted vertically on block 187. It is evident that this tilting of the lever 206 results in opening the jaws when they reach their lowest level. When the head 197 is raised sufficiently to break the contact between the lever 206 and bolt 208, the spring 202 closes the jaws, the closing action being adjusted by the screw 207.

The head 197 is provided with a depending cylindrical boss 209 which is adapted to seat in the axial recess 210 of the block 187.

The head 197 is provided with a horizontally projecting toe 211 which is adapted during its upward movement to force upwardly a sliding collar 212 on push rod 213. 214 is a split collar adapted to be adjusted and clamped stationary on the rod 213, and 215 is a helical buffer spring coiled about said rod above the collar 212 to provide resiliency in the contact of the sliding collar with the fixed collar. The push rod is slidably mounted in the platform 179 and the top of the gallows frame 195. The upper end of said push rod is gripped by spring friction jaws 213ª mounted on the frame, see Fig. 23. Near its lower end said rod is provided with a radial finger 216 which is adapted, in its upward movement to push upwardly and inwardly the stem 217 of a check valve S shown in enlarged cross section in Fig. 21.

The rotary block 187 is provided at its rear with a cam edge or surface 218 which contacts with and actuates the piston 219 of a piston valve T, Figs. 2 and 18.

Said piston valve is shown in longitudinal section in Fig. 2 and is provided with a cylindrical casing into one end of which the piston 219 projects. The other end of the casing is provided with a threaded port 220. The side of the casing is provided with three ports alined at equal distances apart. The central port 221 is a relief port to atmosphere. The outer port 222 is connected by a pipe 223 with the upper end of the lifting cylinder R, while the inner port 224 is connected by a pipe 225 with the lower end of cylinder R.

The piston 219 is provided intermediate of its ends with a diametric passage 226 which connects at one end with a groove 227 running to the inner end of the piston. 228 is a recess on the opposite side of the piston adapted to connect either the port 222 or the port 224 with the relief port 221 according as the piston is extended or retracted.

The passage 226, groove 227 and recess 228 are so located that when the piston rod 219 is in its extended or outermost position, with the port 224 exposed by the outward movement of the inner end of the piston, as shown in Fig. 2ª, the recess 228 connects the port 222 and consequently the upper end of cylinder R to the relief port 221, while when the piston 219 is forced inwardly to the retracted or innermost position, as shown in Fig. 2, the passage 226 registers with the port 222 while the port 224 is connected to the relief port 221 by the recess 228, thus connecting the upper end of the cylinder R with the inlet port 220.

When the piston is in its neutral position, as shown in Fig. 2ᵇ, or midway between its extended and retracted positions above described, then both the ports 221 and 222 are sealed by the lap of the valve. The cam surface 218 is so formed that when the parison jaws are positioned at the parison mold, a low portion 218ª is engaged by the valve piston, thus allowing the piston to be extended, connecting the lower end of the cylinder R to the pressure port 220, while the upper end of said cylinder is connected to the relief port 221. The other end of the cam surface 218 is provided with a high portion 218$^b$ which, when the parison jaws are at the blow mold, will force inwardly the piston 219, so that the upper end of said cylinder will be open to pressure and the lower end to relief. The intermediate portion of the cam is a true concentric with the axis of the cam member and is so formed that during the swing of the parison jaws in either direction, the piston is held in its neutral or intermediate position wherein the ports 222 and 224 are sealed by the lap of the valve.

The fluid pressure supply of the table rotating cylinder 18, the table locking cylinders 29, the shear mechanism O, the blow mechanism P and the cylinders Q and R and the piston valve T are all controlled by the automatic valve M, which is similar in structure to the valve L.

Thus the casing of valve M is provided at one side with a central pressure inlet port 229 to which is connected the constant pressure supply pipe 135. Diametrically opposite is a pressure relief port 230 provided with a waste pipe 231 which cools the sliding block 16 by discharging the waste pressure at intervals thereon. 232 and 233 are a pair of ports on either side of and equally distant from the port 230. 234 is the sliding valve body provided on one side with the groove 235 always in communication with the pressure port 229 and on the other side of the valve body is short recess 236 adapted to connect either the port 232 or 233 to the relief port 230 according to the position of the valve body. 237 and 238 represent a pair of diametric passages in the valve body so positioned that when the valve body is in the position shown in Fig. 2, the passage 238 connects the port 233 to the pressure port 229 while the port 232 is connected with the relief port 230 and waste pipe 231, but when the valve body is shifted to the other end of the casing, the passage 237 will connect the port 232 to the pressure port 229 while the port 233 is connected to the relief port 230 and waste pipe 231 by the recess 236.

239 represents a pair of small bleeder passages leading from the groove 235 through the ends of the valve body.

As previously explained, one end of the valve casing, that adjacent to the port 232, is connected to the pipe 151 provided with bleeder valve 152 which is temporarily opened at the completion of the forward movement of the mold tables, thus relieving the pressure in the corresponding ends of the automatic valves M and L. The other end of the casing of valve M is connected by a pipe 240 with a relief valve 241 which is operated by the workman's punty as he places a fresh gather of glass in the waiting parison mold H which has just been moved in front of him.

The port 232 is connected by a branched pipe 242 with the rear end of the table rotating cylinder 18, the rear end of the cylinder of the shear mechanism O, the lower end of the cylinder of the blow mechanism P, the upper ends of the table locking cylinders 29, and the rear end of the transfer cylinder Q. The port 233 is connected by a branched pipe 243 with the front end of the rotator cylinder 18, the front end of the cylinder of shear mechanism O, the upper end of the cylinder of blowing mechanism P, the lower ends of the table locking cylinders 29 the top port 244 of the check valve S and the end port 220 of the piston valve T.

The check valve S, shown in section in Fig. 21 has an inlet port 244 and an outlet port 245 between which is interposed the ball valve 246 opening toward the port 244 and resiliently seated by spring 247 held in place by adjustable bushing 248. The stem 217 of the ball valve protrudes from the valve casing in the path of the finger 216 of the push rod 213, as previously described. The port 245 is connected by a pipe 249 with the front end of the rotator cylinder Q.

The operation of the pressing mechanism has already been described, the pressing plunger being started downwardly by the opening of the bleeder valve 152 at the completion of the forward movement of the mold tables, and being started upwardly by the opening of the bleeder valve 154 by the piston of the timer N.

Assuming the tables to be stationary and locked, as shown in Fig. 2 and the piston rod 17 of the rotator cylinder 18 to be retracted ready to impart a movement to the mold tables, the operator places a fresh gather of glass in the parison mold positioned at the station next before the pressing station and with the handle of his punty, as he deposits the gather, he actuates the operating valve 241, thus relieving the pressure in the right end of the casing of valve M, causing the valve body to shift until the branched pipe 242 is connected to pressure, and the branched pipe 243 connected to the waste pipe 231.

Thus the shears are closed severing the neck by which the gather is attached to the pipe; the locking piston rods 27 are depressed releasing the table, the blow mechanism is raised from the blow mold in station I', and the piston rod 17 is extended rotating the tables.

It will be observed that in Fig. 2 the piston rod of the transfer cylinder Q is retracted, thus indicating that the jaws of transfer device are positioned at the blow mold to which they have just delivered a parison, the jaws being lowered and open because the protrusion 218ᵇ of the cam surface 218 has forced in the piston 219 into its retracted or innermost position, connecting the top of the cylinder R to pressure and the bottom of the same to relief, pressure having been admitted to the port 220 of the valve T through the pipe 243, while the rotator arms were moving backwardly. When pressure is admitted to the pipe 242 to begin a movement of the tables, as described, pressure is likewise admitted to the rear end of the cylinder Q, thus extending the piston rod 182 and swinging the still depressed parison jaws over to meet the advancing mold H in which a parison has just previously been pressed. The jaws, 204, being open, clear the protruding parison as they register with the parison mold.

The jaws remain lowered during their movement toward the parison table owing to the fact that pipe 243 is connected to relief.

When the rotator block 16 has reached the end of its extension stroke the bleeder valve 152 is opened and the valve M assumes the position shown in Fig. 2, with the result that pressure is once more admitted to the pipe 243, thus again establishing pressure in the valve T, thus forcing the valve piston 219 out into engagement with the depression or hollow 218ᵃ of the cam surface 218, thus causing said piston to assume the position shown in Fig. 2ᵃ. In such case the pressure is admitted to the lower end of the cylinder R and relieved from the upper end of the same, thus elevating the transfer jaws, which as they begin to rise automatically close downwardly and inwardly about the neck of the parison. When the jaws with the parison carried thereby have been raised to the proper elevation, the toe 211 picks up the floating collar 212 on the rod 213 and carries it up until the spring 215 engages the adjustable, fixed collar 214 when the push rod 213, is started upwardly causing the check valve S to open, and thus admitting pressure to the fornt end of the cylinder Q, thereby causing the transfer jaws, holding the parison, to swing over above the blow mold which is waiting at station Iˣ to receive it. During the swing just described, the cam 218 in turning moves the depression 218ᵃ out of contact with the end of the piston 219, causing the piston to contact and remain in contact with the central or neutral part of the cam during the swing of the transfer, resulting in forcing in and holding the piston at neutral, as shown in Fig. 2ᵇ. This prevents the jaws being elevated any higher and also prevents their descent, as the pressure is now trapped in the lower end of the cylinder R. The jaws, grasping the parison, are thus held elevated until they approach a position above the waiting blow mold, when the protuberance 218ᵇ contacts with the end of the piston 219, forcing it inwardly into its retracted position shown in Fig. 2, thus admitting pressure into the upper end of the cylinder R and relieving it from the lower end thereof. This causes the transfer jaws to descend and as they approach the lower limit of their movement, they automatically open, dropping the parison into the blow mold. The jaws are now in the position first described, and are ready for another impulse caused by the shift of the valve M.

The descent of the cross head 197 causes the toe 211 to strike and engage the heel of the finger 216, thus drawing the push rod 213 downwardly and thereby permitting the check valve S to close, thereby cutting off the pressure from the front end of the cylinder Q. This closing of the check valve S, however, is timed to occur when the transfer jaws are completing their descent to the blow mold. The opening of the check valve S is timed to occur after the parison has been lifted out of the parison mold, and the height to which the parison is lifted, depending upon the length of the parison, is regulated by adjusting the time of opening the check valve. This adjustment of the opening of the check valve is accomplished by adjusting the position of the collar 214 on the rod 213. When the check valve is opened, the cam surface 218 begins to turn, thus stopping the lifting action.

It is thus seen that after the jaws deliver a parison to the waiting blow mold and the tables begin to rotate, the jaws, still depressed and open, swing over to the parison mold which is being turned into the parison take off position. When the tables stop the transfer jaws are open and in a lowered position over the parison. When the rotator arms begin their backward movement, the jaws close and seize the parison and then rise and are swung over toward the waiting blow mold and then descend and open, dropping the parison in the mold.

To cushion the inward stroke of the piston in cylinder 18 and prevent jarring the mechanism, I interpose the cushion valve 250, shown in section in Fig. 20, wherein the port 251 connects the cylinder end with the valve chamber 252 in the valve casing. A passage 253 extends through the casing from the chamber 252 to the outside of the casing where the pressure pipe 242 is attached. An inwardly opening ball valve 254 is adapted to close the passage 253 against escaping pressure. 255 is a by-pass around the ball valve whose capacity is adjustable by the needle valve 256. Thus the rate of escape from the rear end of the cylinder 18 may be adjusted to give any desired rate of movement, but the pressure in entering the cylinder from the pipe 242 is unimpeded, thus not cutting down the pressure behind the piston when the piston rod is being extended to rotate the mold table.

I prefer to provide a similar cushion valve on the rear end of the rotator cylinder Q. I also prefer to provide the double piston valve 257 for the pressure connection for the front end of the cylinder Q, said valve being shown in section in Fig. 19, wherein the port 258 is connected to the end of the cylinder and its inner end connects with a valve chamber 259 from which a passage 260 leads to the outside of the valve casing for the connection of the pipe 249. An inwardly opening ball valve 261 is adapted to close the inner end of the passage but does not interfere with entering pressure but however seats and seals the inner of the passage 260 against the escape of pressure from the cylinder. 262 is bypass around the ball valve, adjustable by the needle valve 263. 264 is another port leading into the cylinder end and connected by passage 265 to the passage 260 outside of the ball valve. Passage 265 is also controlled by a needle valve 266. It is thus seen that the escape of pressure from the front end of the cylinder Q may be regulated to obtain any desired speed of operation.

The sockets, such as 4, in the frame A, in which the standards B, C and D are secured are preferably intersected tangentially by key seats 267 in which is the key bolt 268, whose protruding end is threaded and provided with a nut 269 which screws up against the face of the frame A to move the key longitudinally, the key is cut out to loosely fit the side of the standard and said curved cut out portion is grooved or serrated longitudinally, so that when the key bolt is moved longitudinally by means of the nut 269, it grips the standard and holds it rigidly in place. The standards can be held at any desired elevation.

I have shown the fluid pressure control actuated by a pressure relief valve operated by the workman in placing the gathers in the parison molds, but it will be understood that mechanical or automatic gathering or glass feeding mechanism may be substituted and means provided for actuating the automatic valve when the glass has been or is being deposited in a mold.

Although for the sake of clearness I have minutely described the embodiment of the principles of my invention illustrated in the drawings, I do not wish to limit myself thereby, but claim broadly:

1. In a glass machine, the combination of a rotary parison mold support, a rotary finishing mold support, an oscillatory rotator arm associated with one of said supports and adapted to rotate said support during its motion in one direction, a second oscillatory rotator arm adapted to rotate the other support during its like motion, and common means for swinging said rotator arms in both directions.

2. In a glass machine, the combination of a rotary parison mold support, a rotary finishing mold support, an oscillatory rotator arm associated with one of said supports and adapted to rotate said support during its motion in one direction, a second oscillatory rotator arm adapted to rotate the other support during its like motion, and common fluid pressure operated means for swinging said rotator arms in both directions.

3. In a glass fabricating machine, the combination of a frame, a parison mold support rotatably mounted on said frame, a finishing mold support rotatably mounted on said frame, an oscillating arm associated with said parison mold support, a second oscillating arm associated with the finishing mold support, means whereby said arms rotate their respective mold supports when moving in one direction but said mold supports are stationary when said arms are moving in the other direction, and common means for oscillating said arms.

4. In a glass fabricating machine, the combination of a frame, a parison mold support rotatably mounted on said frame, a finishing mold support rotatably mounted on said frame, an oscillating arm associated with said parison mold support, a second oscillating arm associated with the finishing mold support, means whereby said arms rotate their respective mold supports when moving in one direction but said mold supports are stationary when said arms are moving in the other direction, and operative connection between said arms whereby they move in unison.

5. In a glass machine, a bed frame, a parison mold support and a finishing mold support rotatably mounted on said bed frame, a transfer device adapted to transfer the parisons from the parison mold support to the finishing mold support, fluid pressure means for rotating said supports intermittently, fluid pressure means for operating said transfer device, a common control valve for both of said means, and means for actuating said control valve in one direction by the rotation of the supports and in the other direction by the placing of the gathers in the parison molds.

6. In a glass machine, a bed frame, a parison mold support and a finishing mold support rotatably mounted on said bed frame, a transfer device adapted to transfer the parisons from the parison mold support to the finishing mold support, fluid pressure means for rotating said supports intermittently, fluid pressure means for operating said transfer device, a common control valve for both of said means, and means for actuating said control in one direction at the completion of the movement of said supports and in the other direction when a gather of glass is placed in a parison mold.

7. In a glass machine, the combination of a rotary parison mold support, a rotary finishing mold support, a transfer device for transferring the parisons from the parison mold support to the finishing mold support, fluid pressure means for rotating said mold supports intermittently, fluid pressure means for operating said transfer means, and a common control valve for both of said fluid pressure means.

8. In a glass machine, the combination of a rotary parison mold support, a rotary finishing mold support, a transfer device for transferring the parisons from the parison mold support to the finishing mold support, fluid pressure means for rotating said mold supports intermittently, fluid pressure means for operating said transfer means, a common control valve for both of said fluid pressure means, and means whereby said control valve is actuated in one direction at the completion of a movement of the supports and in the other direction when a gather of glass is placed in a parison mold.

9. In combination with a glass fabricating machine provided with a pair of rotary tables, parison molds mounted on one of said tables, forming means associated with said parison molds, blow molds mounted on the other of said tables, blowing means associated with said blow molds, a parison transfer device consisting of a movable support, parison grasping members carried by said support, a fluid pressure cylinder and piston mechanism adapted to raise and lower said support, a second fluid pressure cylinder mechanism adapted to oscillate said support on a vertical axis, automatic control mechanism for said cylinder and piston mechanisms, and means whereby said automatic control mechanism is actuated by the operation of said glass machine.

10. In combination with a glass fabricating machine provided with a pair of rotary tables, parison molds mounted on one of said tables, forming means associated with said parison molds, blow molds mounted on the other of said tables, blowing means associated with said blow molds, a parison transfer device consisting of a movable support, parison grasping members carried by said support, a fluid pressure cylinder and piston mechanism adapted to raise and lower said support, a second fluid pressure cylinder mechanism adapted to oscillate said support on a vertical axis, automatic valve mechanism controlling said cylinder and piston mechanisms, and means whereby said valve mechanism is actuated by the operation of said glass machine.

11. For use in connection with a glass fabricating machine of the character described, a parison transfer device consisting of a vertically disposed frame, a support pivotally mounted in said frame to swing on a vertical axis, said support being also movable vertically of said frame, a fluid pressure cylinder and piston mechanism carried by said frame and adapted to oscillate said support, a second fluid pressure cylinder and piston mechanism adapted to raise and lower said support, and means actuated by the operation of said fabricating machine for controlling the action of said fluid pressure cylinder and piston mechanisms.

12. For use in connection with a glass fabricating machine of the character descibed, a parison transfer device consisting of a vertically disposed frame, a support pivotally mounted in said frame to swing on a vertical axis, said support being also movable vertically of said frame, a fluid pressure cylinder and piston mechanism carried by said frame and adapted to oscillate said support, a second fluid pressure cylinder and piston mechanism adapted to raise and lower said support, valvular control mechanism for said fluid pressure cylinder and piston mechanisms, and means whereby said valvular control mechanism is actuated by the operation of said fabricating machine.

13. For use in connection with a glass fabricating machine of the character described, a parison transfer device consisting of a vertically disposed frame, a support pivotally mounted in said frame to swing on a vertical axis, said support being also movable vertically of said frame, a fluid pressure cylinder and piston mechanism carried by said frame and adapted to oscillate said support, a second fluid pressure cylinder and piston mechanism adapted to raise and lower said support, parison grasping members carried by said support and adapted to close and open to seize and to release the parisons, and means whereby the opening and closing of said members is controlled by the movement of said support.

14. For use in connection with a glass fabricating machine of the character described, a parison transfer device consisting of a vertically disposed frame, a support pivotally mounted in said frame to swing on a vertical axis, said support being also movable vertically of said frame, a fluid pressure cylinder and piston mechanism carried by said frame and adapted to oscillate said support, a second fluid pressure cylinder and piston mechanism adapted to raise and lower said support, coacting parison grasping members carried by said support, and means actuated by the movement of said support for causing said members to seize and to release the parisons.

15. For use in connection with a glass fabricating machine of the character described, a parison transfer device consisting of a vertically disposed frame, a support pivotally mounted in said frame to swing on a vertical axis, said support being also movable vertically of said frame, a fluid pressure cylinder and piston mechanism carried by said frame and adapted to oscillate said support, a second fluid pressure cylinder and piston mechanism adapted to raise and lower said support, coacting parison grasping members carried by said support and adapted to be closed together to seize the parisons and to be spread apart to release the parisons, and means whereby when said support is in its lowermost position said members are opened but when said support is raised said members are closed.

16. For use in connection with a glass fabricating machine of the character described, a parison transfer device consisting of a vertically disposed frame, a support pivotally mounted in said frame to swing on a vertical axis, said support being also movable vertically of said frame, a fluid pressure cylinder and piston mechanism carried by said frame and adapted to oscillate said support, a second fluid pressure cylinder and piston mechanism adapted to raise and lower said support, coacting parison grasping members carried by said support and adapted to be closed together to seize the parisons and to be spread apart to release the parisons, means whereby said members are normally closed to seize and hold the parisons, but when said support is in its lowermost position said members are spread apart.

17. A device for transferring parisons from a parison mold to a finishing mold comprising coacting parison grasping jaws, a support upon which said jaws are carried, a fluid pressure mechanism adapted to move said support horizontally, a second fluid pressure mechanism adapted to move said support vertically, means whereby the operation of one of said mechanisms controls the operation of the other mechanism, whereby the jaws are elevated from the parison mold, moved toward the finishing mold, and moved to the parison mold on the lower level, the first named mechanism being inoperative when the jaws are started upwardly from the parison mold but being actuated by the elevation of the jaws, and the second named mechanism being rendered inoperative by the action of the first named mechanism in moving the elevated jaws in the direction of the finishing mold but being again actuated to lower said jaws as they approach the vertical plane of the finishing mold, and said second named mechanism being inoperative while the lowered jaws are being moved by the first named mechanism from the finishing mold to the parison mold.

18. A device for transferring parisons from a parison mold to a finishing mold consisting of coacting parison grasping jaws, a support on which said jaws are carried, a fluid pressure mechanism adapted to move said support horizontally, a second fluid pressure mechanism adapted to move said jaws vertically, a valve controlling the admission of pressure to said second named mechanism, and means whereby the operation of said valve is controlled by the action of said first named mechanism.

19. A device for transferring parisons from a parison mold to a finishing mold consisting of coacting parison grasping jaws, a support on which said jaws are carried, a fluid pressure mechanism adapted to move said support horizontally, a second fluid pressure mechanism adapted to move said jaws vertically, a valve controlling the admission of pressure to said second named mechanism, and means whereby the operation of said valve is controlled by the action of said first named mechanism, and means whereby the operation of said second named mechanism controls the admission of power to said first named mechanism.

20. A device for transferring glass articles comprising a frame, a support mounted in said frame, means for rotating said support on a vertical axis and for moving said support in a vertical plane relative to said frame, an arm extending radially from said support, a pair of coacting article grasping jaws pivotally mounted on said arm, means for normally maintaining said jaws in their closed relation, and means, actuated by the descent of said support relative to said frame, for spreading said jaws, and means whereby when said support is raised in said frame said jaws close.

21. A device for transferring glass articles comprising a frame, a support mounted in said frame, means for rotating said support on a vertical axis and for moving said support in a vertical plane relative to said frame, an arm extending radially from said support, a pair of coacting article grasping jaws pivotally mounted on said arm, a rocking lever mounted on said arm and having its outer end coupled to said jaws, means whereby when the outer end of said arm is raised said jaws are closed together and when the outer end of said arm is depressed said jaws are spread apart, and means whereby the descent of said support relative to said frame elevates the outer end of said lever.

22. A device for transferring glass articles comprising a frame, a support mounted in said frame, means for rotating said support on a vertical axis and for moving said support in a vertical plane relative to said frame, an arm extending radially from said support, a pair of coacting article grasping jaws pivotally mounted on said arm, a rocking lever mounted on said arm and having its outer end coupled to said jaws in such a manner that when the outer end of said lever is depressed said jaws are spread apart, means whereby when said support is depressed relative to said frame the outer end of said lever is depressed, and means whereby said jaws are closed together when said support rises.

23. A device for transferring glass articles comprising a frame, a support mounted in said frame, means for rotating said support on a vertical axis and for moving said support in a vertical plane relative to said frame, an arm extending radially from said support, a pair of coacting article grasping jaws pivotally mounted on said arm, a rocking lever mounted on said arm and having its outer end coupled to said jaws in such a manner that when the outer end of said lever is depressed said jaws are spread apart, means whereby when said support is depressed relative to said frame the outer end of said lever is depressed, and resilient means whereby said jaws are closed together when said support rises.

Signed at Pittsburgh, Pa., this 13th day of October, 1919.

WILLIAM J. MILLER.